United States Patent Office 2,994,282
Patented Aug. 1, 1961

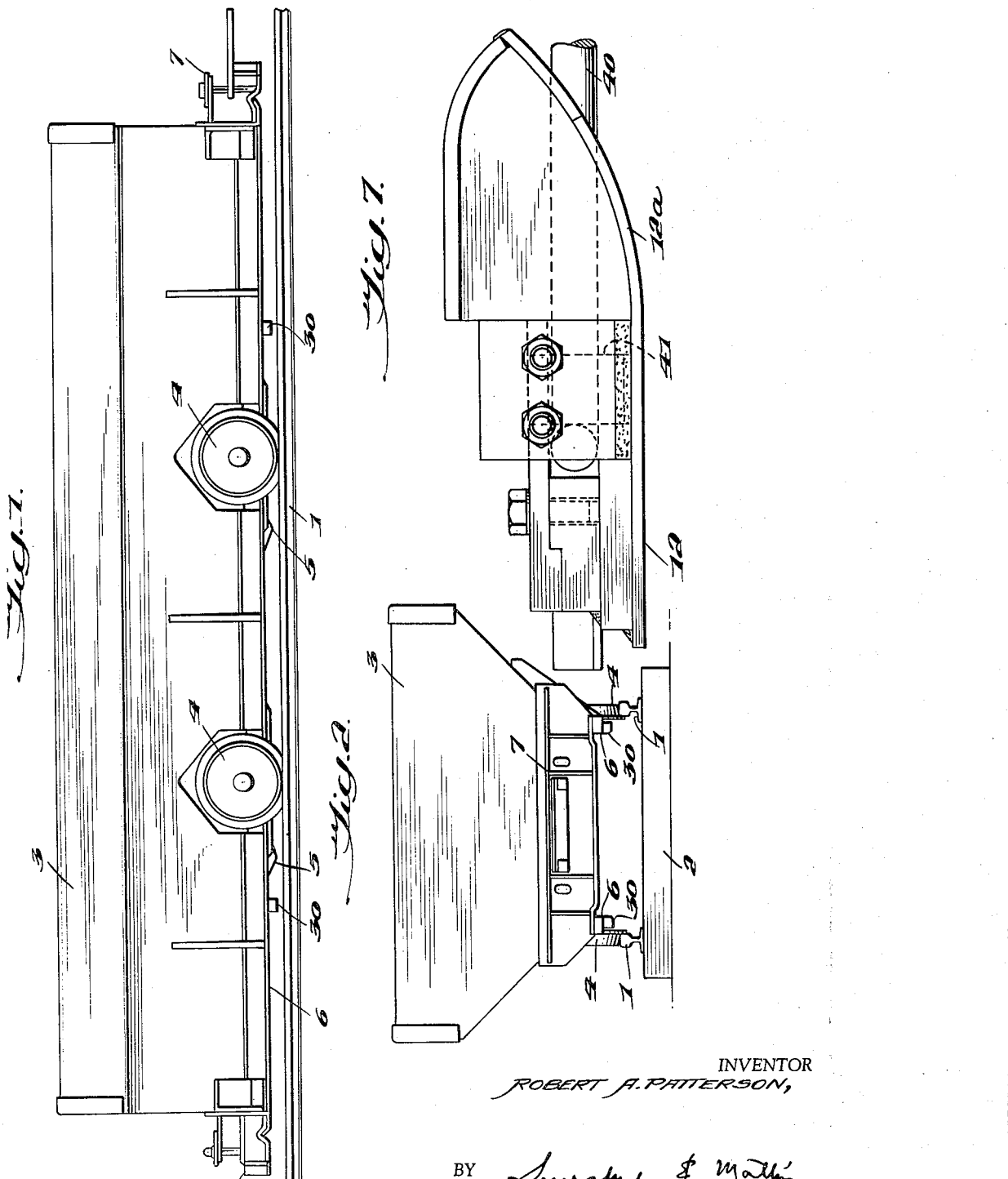

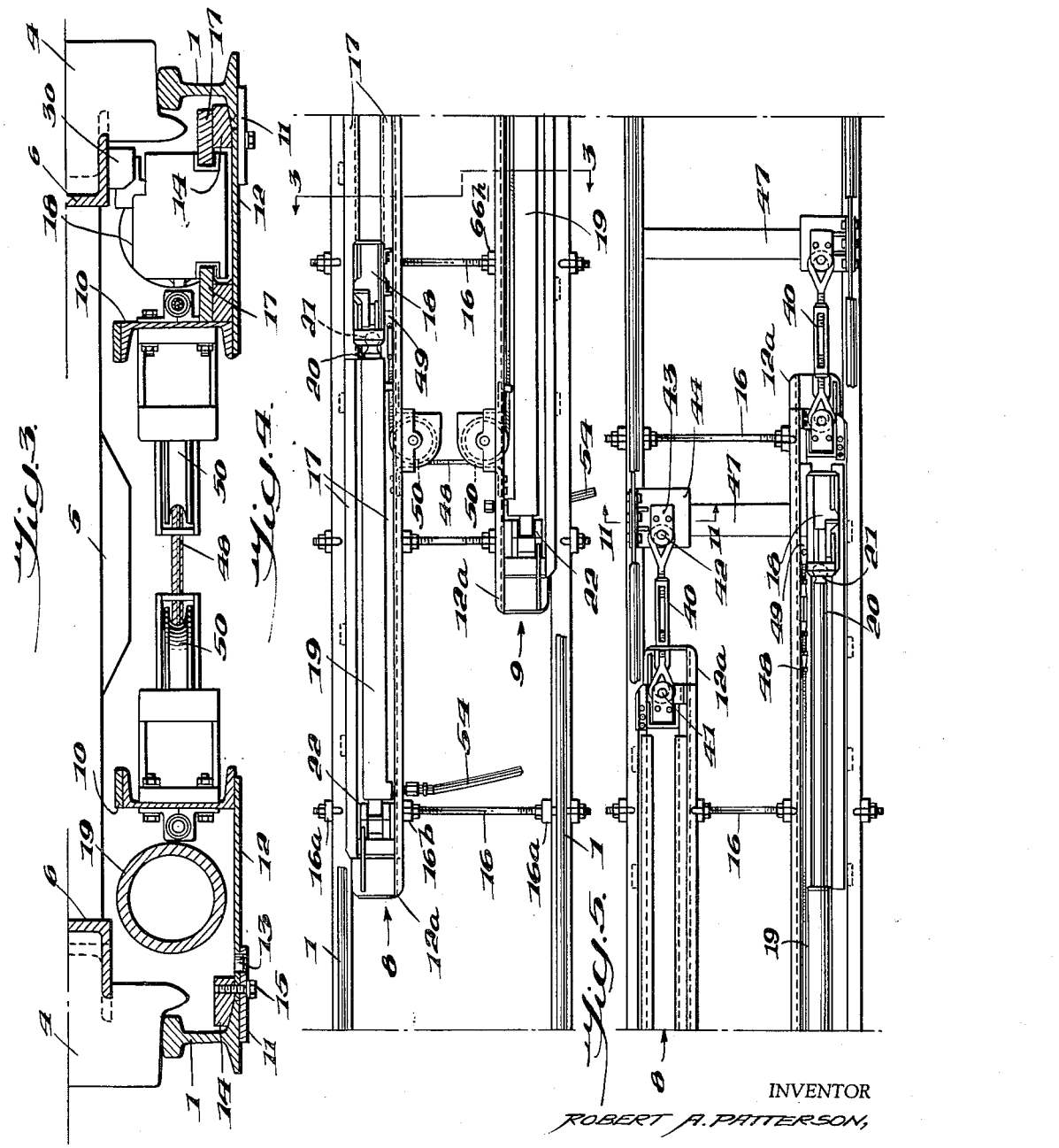

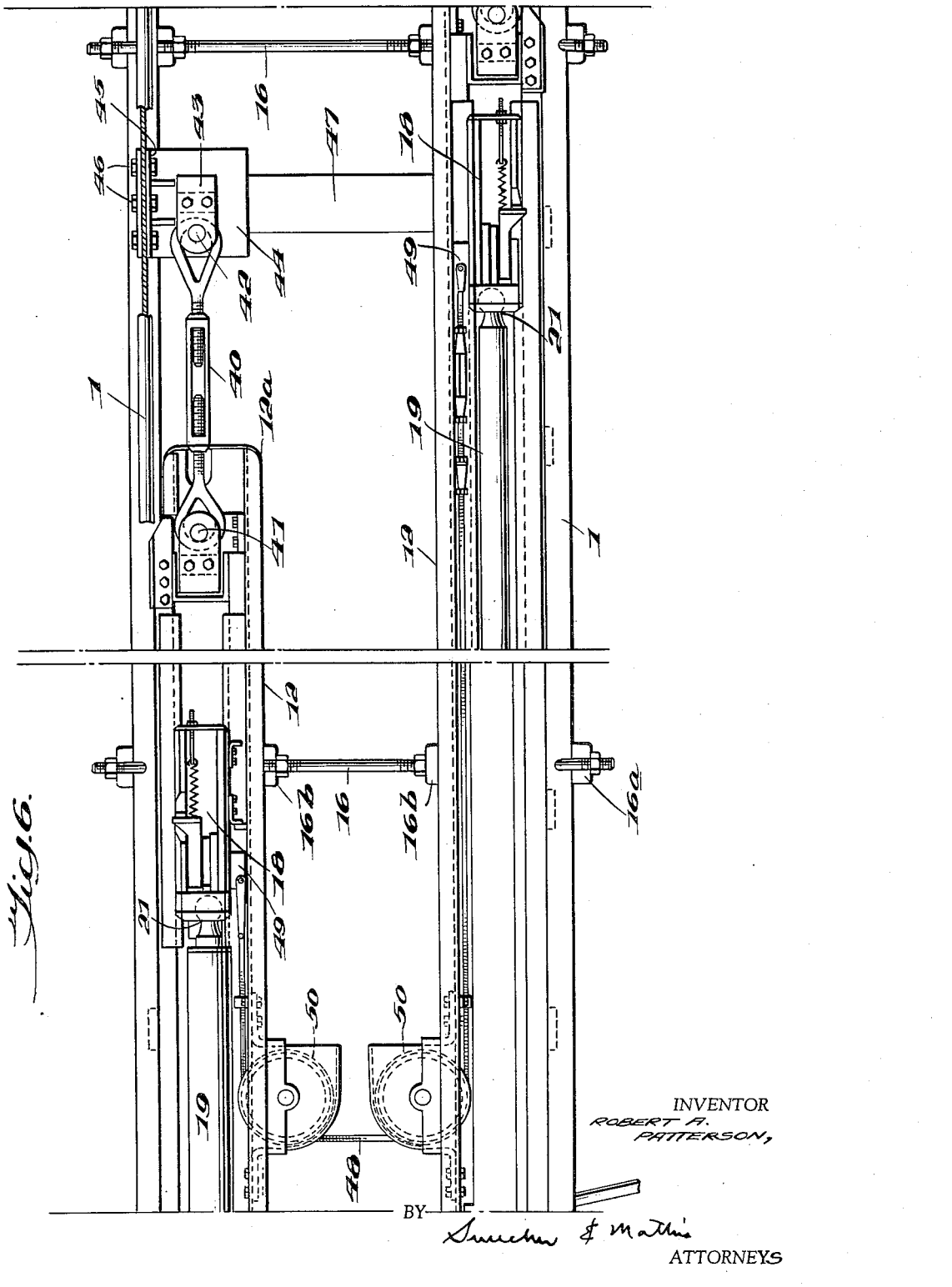

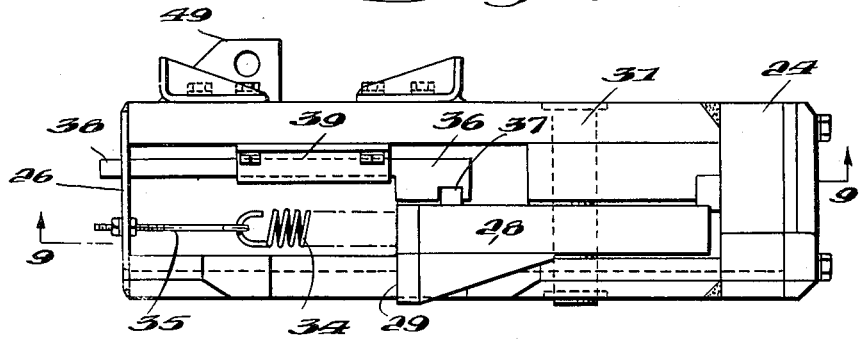
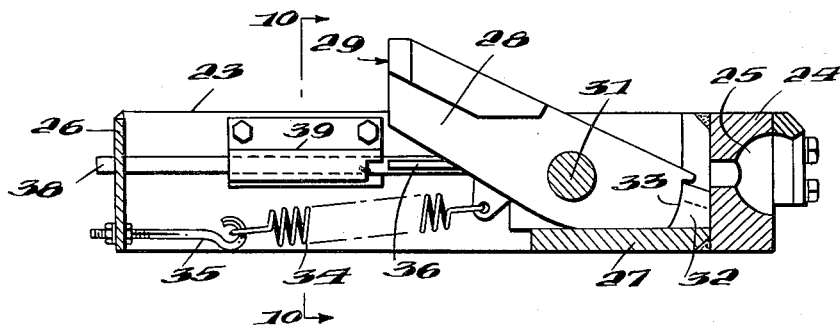
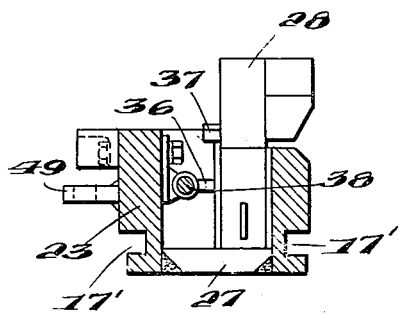 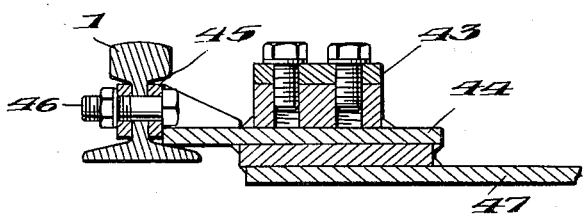

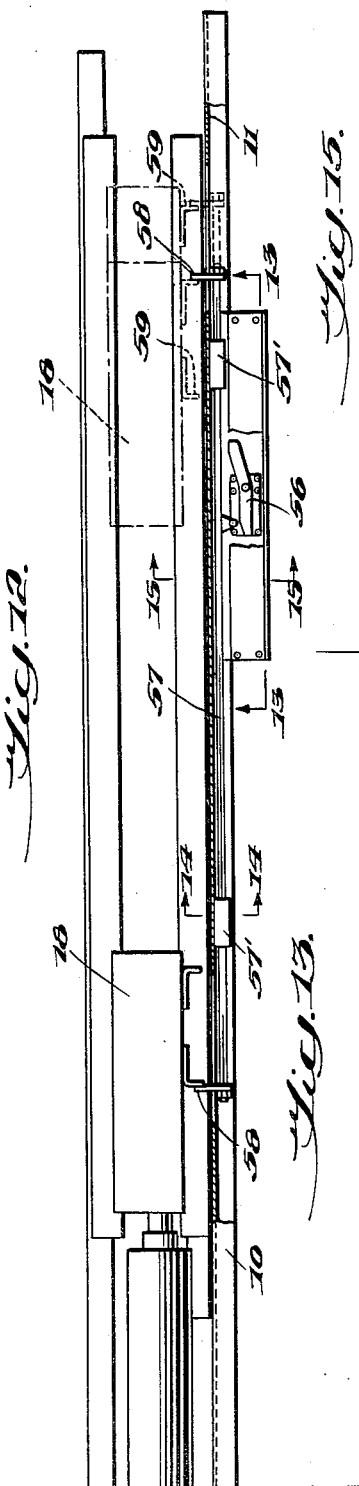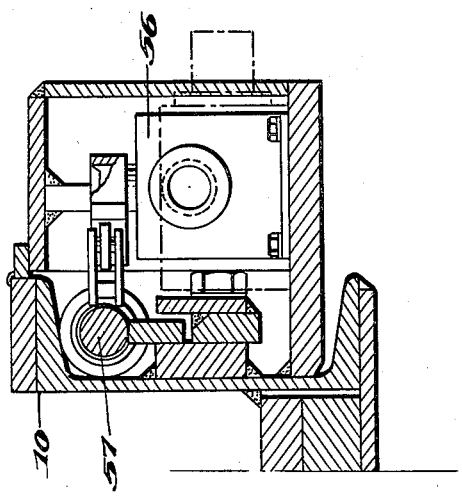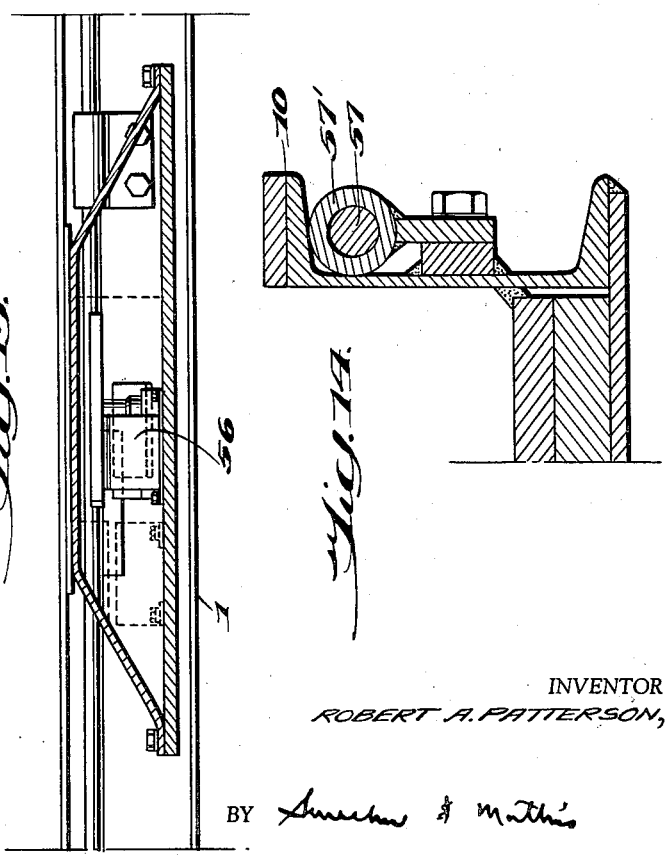

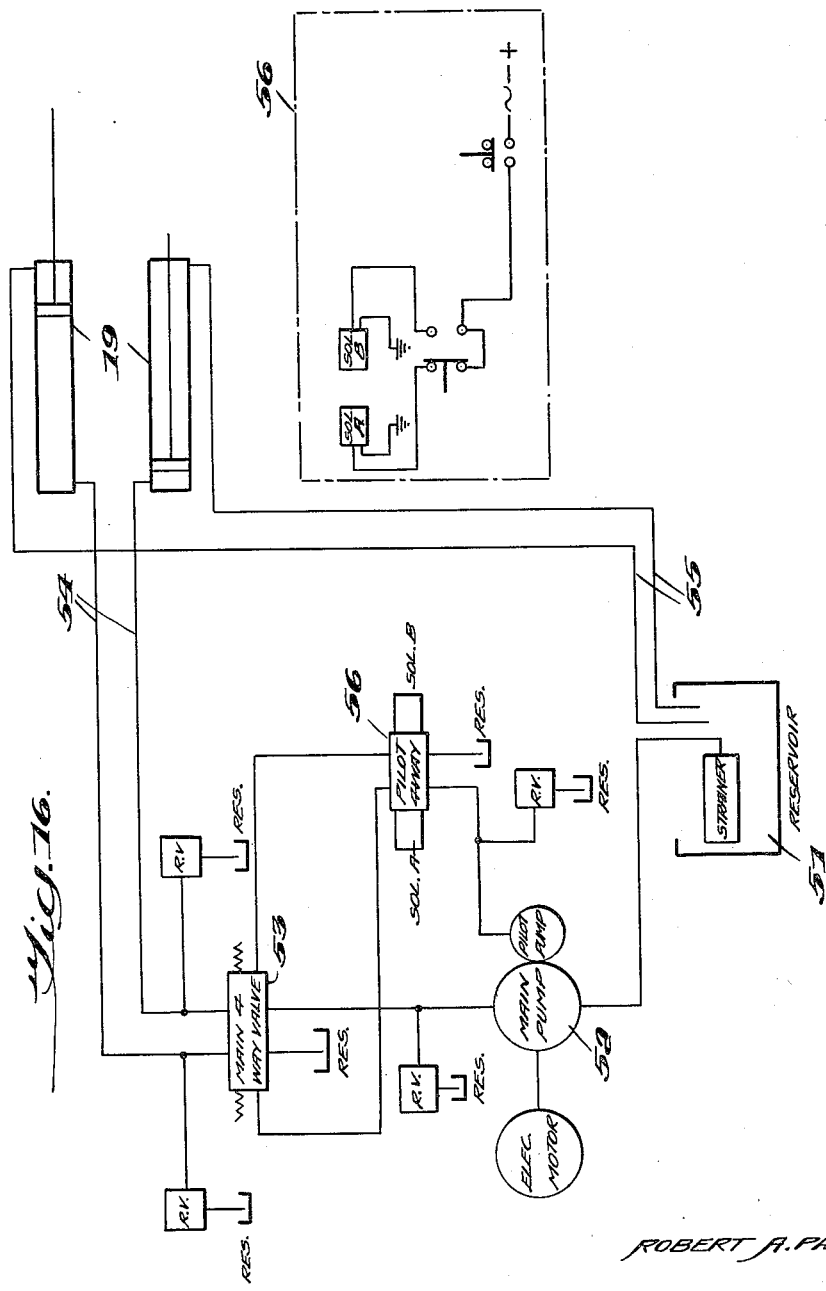

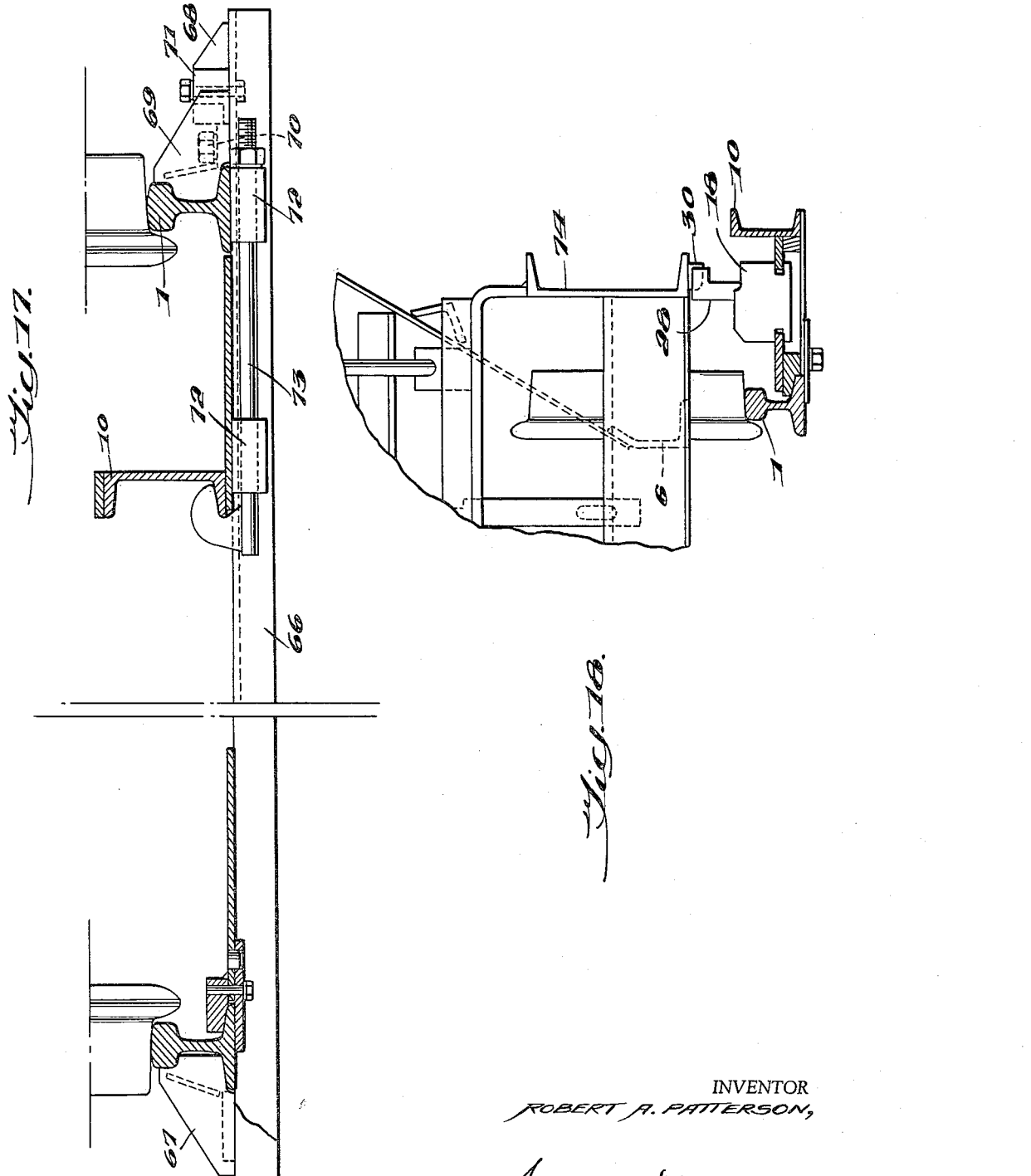

2,994,282
CAR SPOTTING MECHANISMS
Robert A. Patterson, Knoxville, Tenn., assignor to The Sanford-Day Iron Works, Inc. of Tennessee, Knoxville, Tenn., a corporation of Tennessee
Filed Aug. 7, 1958, Ser. No. 753,788
16 Claims. (Cl. 104—162)

This invention relates to improvements in car spotting mechanisms, and more particularly for use with mine cars and the like for advancing these step-by-step to desired positions.

Car spotting mechanisms have been used heretofore for installation in the tracks of mines and other locations for advancing the cars to desired positions.

Some of these have worked satisfactorily with some types of cars, but have been unsatisfactory for use with drop bottom mine cars. Drop bottom mine cars are usually constructed with a series of drop bottom doors pivotally mounted between side sills and extending substantially throughout the width of the car between the sills. The side sill structures are located close to the inside faces of the wheels and, therefore, close to the rails.

Car spotting mechanisms that operate under hydraulic pressure usually have been mounted approximately midway between the track rails and acting on pads generally located at or near the end of the car. In the event that the pushing member of the car spotting mechanism should miss the pad of a drop bottom mine car, it would engage portions of the doors and thereby cause serious damage. No satisfactory solution has been found heretofore to this problem, although it has been studied to great extent.

Such cars travel on tracks laid in mines and adjacent thereto without too much security and often over irregular and uneven surfaces. Even where the rails are connected together through ties, the mounting of the hydraulic car spotting mechanism separately on the ties midway between the rails, as provided heretofore, has been subject to many objections, particularly the difficulty in holding the track gauge.

The pushing pads cannot be located underneath a drop bottom car of conventional design because the drop bottom doors occupy substantially the entire space between the ends of the car and between the side sills. It was proposed heretofore to use such pushing pads on the ends, but this location has proven to be objectionable since the ends of the car frequently tend to slope downwardly in service and, moreover, these ends are frequently deflected in a dip in the track. If the pushing pad is located below the bottom of the end sill or bumper at the end of the car, it may strike the ties or other obstructions in the track during movement of the car therealong; and if located above the bottom of the end-sill or bumper, the pushing member of the car spotting mechanism may fail to make contact with it. Consequently, such locations have proven to be unsatisfactory.

One object of this invention is to overcome these objections and to improve the construction of hydraulic car spotting mechanisms.

Another object of the invention is to provide hydraulic car spotting mechanism which will function with drop bottom cars without danger of destruction of the doors or other depending portions of the cars in the event of failure of the mechanism to operate as intended.

Still another object of the invention is to provide car spotting mechanism constructed for attachment directly to the respective side rails so as to hold the track gauge by a clamping action and to eliminate any danger of separation of the rails due to the action of the hydraulic mechanism therebetween.

A still further object of the invention is to provide the units of the hydraulic mechanisms sufficiently separate from each other so that they can be handled independently upon detachment, especially during transportation and installation.

These objects may be accomplished, according to one embodiment of the invention, by providing pushing pads attached to the side sills of the car in such positions that if the pushing member fails to engage the pad during a stroke of the mechanism, the unit would miss a stroke, but no damage to the car would result. In such position, the car spotting mechanism is provided by separate operating units located in close proximity to the adjacent rails on the inside thereof and tied to the respective rails. Moreover, the car spotting units are simplified and improved in their construction and operation for more effective action in moving the cars.

This embodiment of the invention is set forth in the accompanying drawings, in which:

FIG. 1 is a side elevation of a drop bottom mine car mounted on a railway track to which the present invention may be applied;

FIG. 2 is an end elevation of the car, showing the track in cross section;

FIG. 3 is a cross section through the car spotting mechanism, on the line 3—3 in FIG. 4;

FIG. 4 is a top plan view of one end portion of the car spotting mechanism;

FIG. 5 is a similar view of the opposite end portion thereof;

FIG. 6 is a top plan view of the mid-portion of the car spotting mechanism;

FIG. 7 is a side elevation of the front skid assembly;

FIG. 8 is a top plan view of one of the barney assemblies;

FIG. 9 is a longitudinal section therethrough, substantially on the line 9—9 in FIG. 8;

FIG. 10 is a cross section therethrough on the line 10—10 in FIG. 9;

FIG. 11 is a cross section through one of the rails, showing the tie connection therewith, on the line 11—11 in FIG. 5;

FIG. 12 is a top plan view, partly in section, of a rail, showing the disposition of limit switches;

FIG. 13 is a longitudinal section therethrough on the line 13—13 in FIG. 12;

FIG. 14 is a cross section therethrough on the line 14—14 in FIG. 12;

FIG. 15 is a similar view on the line 15—15 in FIG. 12;

FIG. 16 is a diagrammatic view of the hydraulic supply system for the mechanism;

FIG. 17 is a side elevation, partly in section, showing a modified form of rail retainer assembly; and FIG. 18 is a cross section showing a modified form of mounting for use outside the rails.

The invention is shown as applied to a conventional mine car track including a pair of rails, indicated at 1, supported on cross ties 2 extending transversely between the rails and connected together in the usual manner. The invention may be adapted to any suitable track structure, however, and is not to be limited to the precise form disclosed.

A mine car is indicated generally at 3, such, for example, as the conventional coal car or other receptacle adapted to haul suitable lading over the rails 1. The car 3 is provided with the usual lading body supported on wheels 4 mounted on the rails 1 and having drop bottom doors, indicated generally at 5, extending between side sills 6. The drop bottom doors 5 extend throughout the major portion of the length of the body of the car 3 from end to end thereof and have their lateral edges adjacent to the inner faces of the track gauge line. As will be apparent from FIG. 1, the side sills 6 extend throughout the length of the car body and are connected at their opposite ends to combined end-sills and bumpers 7.

The car spotting mechanism comprises two units, generally indicated at 8 and 9 in FIGS. 4 and 5, which units extend lengthwise of the rails 1 in close proximity to the inner side thereof. Each unit is independent of the other, and is capable of sliding or skidding action with respect to the track.

Each unit 8 and 9 includes a guide frame member 10 extending parallel with the adjacent rail 1 and spaced therefrom. A bar 11 is arranged under the adjacent rail 1, spaced from the frame member 10, and connected with the latter through a bottom plate 12 that is shown as spot welded or pinned at 13 to the bar 11 and as welded to the guide bar 10. A bar 14 is also attached to the bottom plate 12 and spaced above the bar 11, cooperating with the latter to form a slot to receive the flange of the rail therebetween. These parts are shown as bolted together at 15 in FIG. 3, although they may be welded or otherwise fastened in rigid and permanent relation, if desired.

The bottom plate 12, fastened secured to the frame member 10 and in alignment with or abutting against the edge of the base flange of the rail, holds the frame member 10 spaced from the adjacent rail. The rail flange fits into the yoke formed along the lateral edge of the bottom plate 12 by the members 11 and 14, and is held therein by adjustable tie rods 16 that extend between opposite rails 1 and are connected thereto at 16a and to the frame guide member 10 at 16b.

It has been found that other forms of supports for the rials may be used in place of the adjustable tie rods 16. A modified form of brace is shown in FIG. 17 and is indicated at 66, in the form of a flat plate which extends beneath the respective rails 1 that are seated thereon. A brace 67 is mounted at one end of the retainer plate 66, being connected rigidly thereto as by welding and extending into bracing relation with one of the rails 1. At the opposite end of the retainer plate 66 is a thrust block 68 spaced appreciably from the adjacent rail 1. A brace assembly 69 is mounted on the last-mentioned end of the rail retainer plate 66 in bracing relation with the adjacent rail 1 and is bolted to the plate at 70. Between this bolted assembly 69 and the thrust block 68 is an adjustment block 71 adjustably locked in position on the plate 66 and capable of movement to different positions with respect thereto, for locking the brace assembly 69 securely against the rail.

Mounted on opposite sides of the retainer plate 66 are eyes 72 having the axes thereof extending parallel with the length of the plate 66. Rail clamp bar assemblies 73 extend through the eyes 72 and have adjustable connection with the frame members 10 where the latter are used for tightening it toward the rail and holding it in place. At other points where the track unit is not located, a shorter rail clamp member may be used, extending through only one eye 72 for securing the rail and the track member 66 together.

The bottom plate 12 extends along the rail throughout the length of each unit. The plate 12 supports the unit for skidding action along the track. Preferably, the plate 12 has a guide head 12a (FIGS. 4 and 7) at the forward end thereof to facilitate skidding action thereof.

Guides are provided at 17 on opposite sides of the space between the guide frame member 10 and the adjacent rail 1. Between the guides 17 is operatively mounted a barney, generally indicated at 18. The barney 18 is connected with an hydraulic cylinder 19 extending lengthwise of the bottom plate 12. The cylinder 19 has a piston rod 20 projecting from the end thereof toward the barney 18 and is provided with a suitable swivel connection with the barney 18, such as through a ball and socket joint, indicated generally at 21. The opposite end of the cylinder 19 is secured to the bottom plate 12, preferably by a pivot pin, at the point indicated at 22 in FIG. 4.

The barney may be constructed substantially as shown in FIGS. 8 to 10. A housing is shown at 23 with lengthwise guideways 17' at opposite sides thereof for receiving the guides 17. The housing 23 has a head 24 at one end thereof, provided with a spherical seat 25 adapted to receive the ball of the ball and socket joint 21 for connecting the piston rod 20 to the housing of the barney.

The housing 23 is open at the top and bottom throughout the major portion of the length thereof, but the end thereof opposite from the head 24 is closed by an end plate 26. A plate 27 extends across the housing 23 adjacent the head 24 thereof, to limit the upward swinging movement of the dog or pushing member 28.

The pushing member is indicated at 28, which is in the form of a dog, for imparting movement to the car or cars. The dog 28 is provided with a pushing face 29 on its upper end. A pad or pads 30 (FIGS. 1 and 2) are secured upon the car body 3 in position to be engaged by the face 29 of the dog of each respective spotting unit.

As shown in FIGS. 1 and 2, the pads 30 are secured to the bottom faces of the side sills 6, laterally outside of the car doors 5, with one or more pads on each side sill, according to the length of the car.

The dog 28 is mounted on a pivot pin 31 extending transversely through opposite sides of the housing 23. The dog 28 should fit closely upon the pivot pin 31, whereby the latter will take all of the thrust of the dog, so long as no appreciable wear occurs on the pivot pin hole in the dog. At the lower end of the dog 28, a pillow block 32 is provided with a concave surface curved to correspond with the curved lower end 33 of the dog 28. In the event of any substantial wear between the dog and the pin 31, the thrust will then be taken by the pillow block 32.

The dog 28 is held normally in its raised position by a coiled spring 34 connected at one end with the dog 28 and extending from the latter to a hook 35 on the end plate 26 of the housing. The dog is limited in its raised position by abutment against the plate 27, or other suitable means provided for limiting or adjusting the raised position of the dog. However, normally the dog can be depressed when in a raised position, against the tension of the spring 34.

The dog 28 may be locked in a depressed position by a locking plate 36 (FIG. 8) in position to engage over a lug 37 on one side of the dog 28. The locking plate 36 is mounted on a rod 38 which, in turn, is slidably mounted in a guide 39 secured to one side of the housing 23.

Each unit comprises a barney and cylinder, with one unit adjacent each rail. The construction of the units is the same, except that one barney is right-hand and the other is left-hand.

Each unit is connected with the adjacent rail through a turnbuckle, generally indicated at 40 (FIGS. 5 and 6). One end of the turnbuckle 40 is pivotally connected at 41 with the front guide plate 12a of the bottom plate 12. The opposite end of the turnbuckle 40 is connected at 42 with a rail clamp assembly having a spacer block 43 seated upon a mounting plate 44 (see FIG. 11), which mounting plate 44 is permanently secured, by welding or other type of fastening, to a rail clamp side plate 45.

The bracket assembly, comprising the parts 44 and 45, is secured to the rail 1 through bolts 46. A crossbar 47 is connected with the rail clamp assembly and extends across to and under the opposite rail. Other types of fastenings may be substituted, if desired, for the bolted connection 46.

The respective barneys 18 are connected together through a flexible cable device indicated at 48. One end of the cable device 48 is connected to a bracket 49 extending laterally from the housing 23 of one barney, and the opposite end of said cable device 48 extends to a similar bracket 49 on the other barney 18. Intermediate its ends, the cable device 48 extends over guide sheaves 50 mounted on the respective inner faces of the guide frame members 10.

The hydraulic system connected with the cylinders 19 is illustrated diagrammatically in FIG. 16. The cylinders 19 are supplied with fluid from a main storage reservoir, generally indicated at 51, through a main pump 52 and a suitable control valve 53, such as a conventional 4-way valve which alternately supplies liquid under pressure to the lines 54 of the cylinders 19. The lines 54 serve alternately as input and return lines. The lines 55 serve only to return any oil leakage by the pistons to the reservoir.

As the barney 18 attached to one of the cylinders 19, is moved forward to an extended position, the flexible cable device 48 returns the other barney 18 attached to the piston of the other cylinder 19, to its closed position, and vice versa. The pushing pads 30 are so located on the respective opposite sides of the car 3 (FIG. 1) that when the first-mentioned barney is extended and the second-mentioned barney is retracted, the dog 28 on the latter is behind a pad 30 on the opposite side of the car. When the second-mentioned barney makes its stroke, the dog 28 on the first-mentioned barney will be behind a pad 30, ready for the next stroke. This will continue, step-by-step, until the car is moved to the desired position. The pads are so positioned that, on the last stroke on a car, the retracted barney is behind a pad on the car behind, providing continuous feeding of cars by the unit.

This control is provided by a solenoid actuated pilot valve 56 diagrammatically illustrated in FIG. 16. The solenoids thereof are controlled by a limit switch which is adapted to be tripped by a trip rod 57 slidably mounted through guides 57' on the frame member 10, and having abutments at opposite ends thereof, indicated at 58, in the path of lugs 59 on the adjacent barney 18. Thus, when either barney reaches the limit of its movement, the switch is tripped to reverse the electric contacts and thereby reverse the action of the 4-way valve 56, causing fluid to be admitted to the end of valve 53, which in turn causes fluid to be admitted to the cylinder of the other barney for power actuation.

While I have described the attaching of the pads 30 to the side sill angles of a drop bottom car and the location where these pads would be used in many instances, they can be applied to other parts of the car. An example of such other location is illustrated in FIG. 18. In the latter instance, the pads 30 are secured to an outside longitudinal body support member 74 extending parallel with, but spaced from, the side sill member 6 of the car. This locates the pads outside the rail 1, but the construction in other respects is substantially the same as set forth above and likewise the operation would be the same.

The arrangement described has the advantages of locating the pushing members outside of the doors on automatic drop bottom cars; it is portable, enabling each unit of the car spotting mechanism to be handled with less than half the weight of a single frame unit of comparable size; and the unit is more portable because each section that must be handled is shorter in length than a single frame unit capable of handling cars of similar length. Because pushing pads are located on the side sills, any length of car can be handled by placing the pads at increments equal to or less than the stroke of the hydraulic unit.

The units of the car spotting mechanism are relatively independent of each other, each of which is capable of skidding action along the track without requiring simultaneous movement of the other unit. These units rest on the rail ties 2 and may be moved readily to the required positions. The units are separately attached by a rail clamp assembly to the respective rails, which connection can be made easily and readily, when desired, and as easily removed, when moving the units to a new location.

While the invention has been illustrated and described in one embodiment, it is recognized that variations and changes may be made therein without departing from the invention as set forth in the claims.

I claim:

1. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, and car spotting units mounted on the track adjacent the lateral rails and including relatively movable devices in positions to alternately engage the laterally spaced pads for advancing the car along the track.

2. In car spotting mechanism the combination with a railway track including laterally spaced rails, of a car mounted on the track and comprising a lading body having a bottom structure with one of more drop bottom doors and side sill structures on opposite sides of the doors, pads mounted on the side sill structures at opposite sides of the doors, and car spotting units mounted on the track adjacent the rails, each unit including an hydraulic cylinder and a barney movably mounted relative to the rail, and means on the barney in position to alternately engage first a pad on one side of the car and then a pad on the other side of the car to advance the car.

3. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, laterally spaced car spotting units mounted on the track adjacent the rails so that the distance between the units is at least greater than the width of the car doors, each unit including an hydraulic cylinder and a barney movably mounted relative to the rail, and means on the barney in position to engage one of the pads to advance the car, the units being arranged substantially parallel but longitudinally offset relative to one another.

4. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, car spotting units mounted on the track adjacent the rails, each unit including an hydraulic cylinder and a barney movably mounted relative to the rail, and means on the barney in position to engage one of the pads adjacent to that side of the track on which said barney is positioned to advance the car, and means for interconnecting the barneys together for alternately operating the car spotting units for moving a car thereby.

5. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, car spotting units mounted on the track in laterally spaced relation from each other and in juxtaposed relationship with the respective rails, means connecting the units with the respective rails for holding the units thereto, each unit including an hydraulic cylinder and a barney having means in position for engagement with one of the pads to advance the car.

6. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, car spotting units mounted on the track in laterally spaced relation from each other and adjacent the respective rails, means connecting the units with the respective rails for holding the units thereto, each unit including an hydraulic cylinder and a barney having means in position for engagement with one of the pads to advance the car, means forming a skidable support for each unit independent of the other unit, and means connecting each unit at an end thereof with the adjacent track rail.

7. In car spotting mechanism the combination with a railway track including laterally spaced rails, of a car mounted on the track and comprising a lading body having a bottom structure with one or more drop bottom doors and side sill structures on opposite sides of the doors, pads mounted on the side sill structures at opposite sides of the doors, car spotting units mounted on the track in laterally spaced relation from each other and adjacent the respective rails, means connecting the units with the respective rails for holding the units thereto, each unit including an hydraulic cylinder and a barney having means in position for engagement with one of the pads to advance the car, and means forming a flexible connection from one of the barneys to the other for alternately returning the barneys upon advancing movement of the other.

8. In car spotting mechanism adapted to be applied to a railway track having laterally spaced rails, the combination of a pair of spotting units each including a power cylinder and a barney operatively connected with the cylinder, an elongated skid plate, a guide frame member at one edge of the skid plate, means at the opposite edge of the skid plate for connecting said skid plate with a rail, and guiding means for the barney between the frame guide member and the rail.

9. In car spotting mechanism adapted to be applied to a railway track having a pair of laterally spaced rails, the combination of a pair of spotting units arranged substantially in parallel and longitudinally offset relation to each other and adapted to be mounted on the track between the rails, each of said units including an elongated skid plate having a guide frame member extending along one edge thereof and secured thereto, means extending along the opposite edge of said guide plate for connection of the plate with the rail, means forming guides along opposite edge portions of the guide plate, a power cylinder mounted on the guide plate, a barney operatively connected with the power cylinder and mounted on the guides for longitudinal movement relative to the track.

10. In car spotting mechanism adapted to be applied to a railway track having a pair of laterally spaced rails, the combination of a pair of spotting units arranged substantially in parallel and longitudinally offset relation to each other and adapted to be mounted on the track between the rails, each of said units including an elongated skid plate having a guide frame member extending along one edge thereof and secured thereto, means extending along the opposite edge of said guide plate for connection of the plate with the rail, means forming guides along opposite edge portions of the guide plate, a power cylinder mounted on the guide plate, a barney operatively connected with the power cylinder and mounted on the guides for longitudinal movement relative to the track, and anchor means adapted to be connected with one of the rails spaced from the adjacent end of the guide plate, and a link extending from the anchor means to the guide plate and secured thereto.

11. A car spotting unit comprising a barney having a housing, a dog mounted in the housing and having an abutment face on the upper end thereof, a pivot pin supporting the dog for raising and lowering movements, means yieldably urging the dog to a raised position on the pivot pin, said dog having a laterally projecting lug thereon, a locking plate mounted in the housing in position to overlie the lug, and means for moving the locking plate lengthwise of the housing into and out of locking relation to the lug.

12. A car spotting unit comprising a barney having an elongated housing, a dog pivotally mounted in the housing for raising and lowering movements relative thereto, said dog having an abutment face on the upper end thereof, means for yieldably urging the dog in an upward direction, a locking plate slidably mounted in the housing below the top thereof and at one side of the dog, and means connected with the dog in position to engage the locking plate and hold the dog in one position.

13. In car spotting mechanism, the combination with a railway track having spaced rails adapted to receive a car thereon, of an elongated frame member disposed beside one of the rails, a pair of opposed guides mounted on the frame member and on said rail, a barney movably mounted on said opposed guides and having means for engaging and moving a car on the track, and means for operating said barney.

14. In car spotting mechanism, the combination with a railway track having spaced rails adapted to receive a car thereon, of an elongated skid plate extending beside one of the rails, means for securing one longitudinal edge of the plate directly to said rail, an elongated frame member extending along the opposite edge of said skid plate and secured thereto, opposed guides extending along said opposite edges of the skid plate, a barney movably mounted on said opposed guides and having means for engaging and moving a car on the track, and means for operating said barney.

15. In car spotting mechanism, the combination with a railway track having spaced rails adapted to receive a car thereon, of a pair of spotting units mounted beside the respective rails and spaced laterally from each other, each of said units including a longitudinal frame member beside the adjacent rail, means forming a pair of opposed guides on said frame member and the adjacent rail, a barney mounted on the pair of opposed guides of each spotting unit and having means for moving the car, and means for operating the barneys of the spotting units in timed relation.

16. In car spotting mechanism, the combination with a railway track having spaced rails adapted to receive a car thereon, of a pair of spotting units mounted beside the respective rails and spaced laterally from each other, each of said units including a longitudinal frame member beside the adjacent rail, means forming a pair of opposed guides on said frame member and the adjacent rail, a barney mounted on the pair of opposed guides of each spotting unit and having means for moving the car, means for operating the barneys of the spotting units in timed relation, a rail clamp member extending transversely beneath each rail and the adjacent frame member, and abutment means anchoring the clamp member to the respective opposite edges of the rail and frame member.

References Cited in the file of this patent

UNITED STATES PATENTS

| | | |
|---|---|---|
| 720,222 | Christianson | Feb. 10, 1903 |
| 1,162,760 | Fickinger | Dec. 7, 1915 |
| 1,478,676 | Richey | Dec. 25, 1923 |
| 1,908,015 | Getaz | May 9, 1933 |
| 2,606,504 | Stamler | Aug. 12, 1952 |
| 2,847,945 | Merritt | Aug. 19, 1958 |

FOREIGN PATENTS

| | | |
|---|---|---|
| 736,290 | Germany | Sept. 7, 1955 |
| 719,327 | Great Britain | Dec. 1, 1954 |